(12) United States Patent
Rolin et al.

(10) Patent No.: US 6,229,442 B1
(45) Date of Patent: May 8, 2001

(54) RADIO FREQUENCY IDENTIFICATION DEVICE HAVING DISPLACEMENT CURRENT CONTROL AND METHOD THEREOF

(75) Inventors: John Howard Rolin, Morgan Hill; Sebastian T. Kakkanad, San Jose; James G. Quaderer, Sunnyvale, all of CA (US)

(73) Assignee: Motorola, Inc,, Schaumburg, IL (US)

( * ) Notice: Subject to any disclaimer, the term of this patent is extended or adjusted under 35 U.S.C. 154(b) by 0 days.

(21) Appl. No.: 09/525,718

(22) Filed: Mar. 14, 2000

(51) Int. Cl.$^7$ ..................................................... G08B 13/14
(52) U.S. Cl. ................................. 340/572.1; 340/572.2; 340/572.7; 455/78
(58) Field of Search ............................... 340/572.1, 572.2, 340/572.3, 572.4, 572.5, 572.6, 572.7, 572.8, 572.9; 455/78, 193.1, 271, 284; 343/893, 872, 845, 700 MS; 235/439, 487; 342/51

(56) References Cited

U.S. PATENT DOCUMENTS

| | | |
|---|---|---|
| 3,755,803 * | 8/1973 | Cole .................................. 340/572.1 |
| 3,843,036 | 10/1974 | Monahan et al. . |
| 4,783,646 | 11/1988 | Matsuzaki . |
| 4,900,386 | 2/1990 | Richter-Jorgensen . |
| 4,970,495 | 11/1990 | Matsumoto et al. . |
| 5,081,445 | 1/1992 | Gill et al. . |
| 5,175,418 | 12/1992 | Tanaka . |
| 5,288,235 | 2/1994 | Sobhani . |
| 5,430,441 | 7/1995 | Bickley et al. . |
| 5,528,222 | 6/1996 | Moskowitz et al. . |
| 5,566,441 | 10/1996 | Marsh et al. . |
| 5,682,143 | 10/1997 | Brady et al. . |
| 5,710,458 | 1/1998 | Iwaski . |
| 5,786,626 | 7/1998 | Brady et al. . |
| 5,815,076 * | 9/1998 | Herring ................................... 455/78 |
| 5,847,447 | 12/1998 | Rozin et al. . |
| 5,850,187 | 12/1998 | Carrender et al. . |
| 5,854,480 | 12/1998 | Noto . |
| 6,001,211 | 12/1999 | Hiroyuki . |
| 6,043,745 * | 3/2000 | Lake .................................. 340/572.1 |
| 6,122,494 * | 9/2000 | Tuttle ................................ 455/193.1 |

FOREIGN PATENT DOCUMENTS

| | | |
|---|---|---|
| 40 17 934 C2 | 1/1992 | (DE) . |
| 0 245 196 A2 | 11/1987 | (EP) . |
| 0 260 221 A2 | 3/1988 | (EP) . |
| 0 260 221 A3 | 3/1988 | (EP) . |

* cited by examiner

*Primary Examiner*—Jeffery Hofsass
*Assistant Examiner*—Anh La
(74) *Attorney, Agent, or Firm*—Terri S. Hughes (57) ABSTRACT

A radio frequency identification (RFID) device (12) having displacement current control. The RFID device (12) comprises a voltage source (30), and exciter electrode, electronic circuitry, a displacement current control surface (74) and a dielectric. The voltage source has a current return node. The exciter electrode is coupled to the voltage source. The displacement current control surface (74) is placed between the exciter electrode and the electronic circuitry. The dielectric is positioned between the displacement current control surface and the electronic circuitry, wherein the displacement current control surface is electrically terminated to the current return node of the voltage source.

21 Claims, 13 Drawing Sheets

RADIO FREQUENCY IDENTIFICATION DEVICE HAVING DISPLACEMENT CURRENT CONTROL AND METHOD THEREOF

FIELD OF THE INVENTION

The present invention relates generally to communication devices, and more particularly to radio frequency identification (RFID) devices having displacement current control.

BACKGROUND OF THE INVENTION

In general, an RFID system consists of one or more tags, a tag reader, and a host computer system. Tags are devices that can come in many sizes and form factors, but are usually small and lightweight. Tags are commonly used as portable data devices that wirelessly communicate with RFID readers at distances ranging from a few millimeters to several meters. The information stored in a tag can be used, for example, to identify an individual or object carrying the tag.

RFID technology is used in a variety of applications because of its convenience and flexibility. An example application for RFID technology is a building security system. As part of a building security system, RFID systems are used to grant access only to individuals carrying authorized tags (or cards). When an individual places their card in the vicinity of the reader, the reader interrogates the card and obtains identification information stored in the card. After further processing, the reader communicates the individual's identification ("ID") code to a host computer in the security system. If the ID code received by the host computer system is authorized, the door is unlocked to permit access to the building.

RFID systems are also used to detect specific items and link those items with other information and events. RFID systems can be used, for example, to track products being built in a factory, to trigger manufacturing steps to occur, to assist in inventory control, etc. Read-only tags are ones in which the data is programmed once, and the tag only sends the stored information to the reader. Read-write tags have the ability to be reprogrammed to suit the needs of the application. Therefore, read-write tags can be used as portable databases, eliminating the need for central databases.

Most RFID tags contain an integrated circuit ("IC") to store and process data, and to perform communication functions. RFID tags also contain an electrode, which is used as the radio frequency interface with the reader. The IC requires power to operate, which can be supplied by a battery. Most applications, however, require tags to be small and inexpensive, so batteryless, or "passive", tags are in very wide use. Passive tags receive energy from the radio frequency ("RF") field generated by a reader, and the IC converts the RF to direct current ("DC") operating power for itself. Once operating, the IC communicates with the reader, which has an electrode system for transmission and reception of signals. Power and data are transferred between tag and reader through one or more electrodes in each device.

Some tag-reader systems communicate via magnetic fields, while other types of systems communicate via electric fields. Electric field tags offer advantages in cost, size, weight and flexibility compared with magnetic field tags. Many applications demand small, compact and inexpensive readers, as well. Shrinking the size of electric field RFID readers, however, presents unique design challenges. Without addressing these challenges, reader performance is significantly impaired.

Figure 1A:
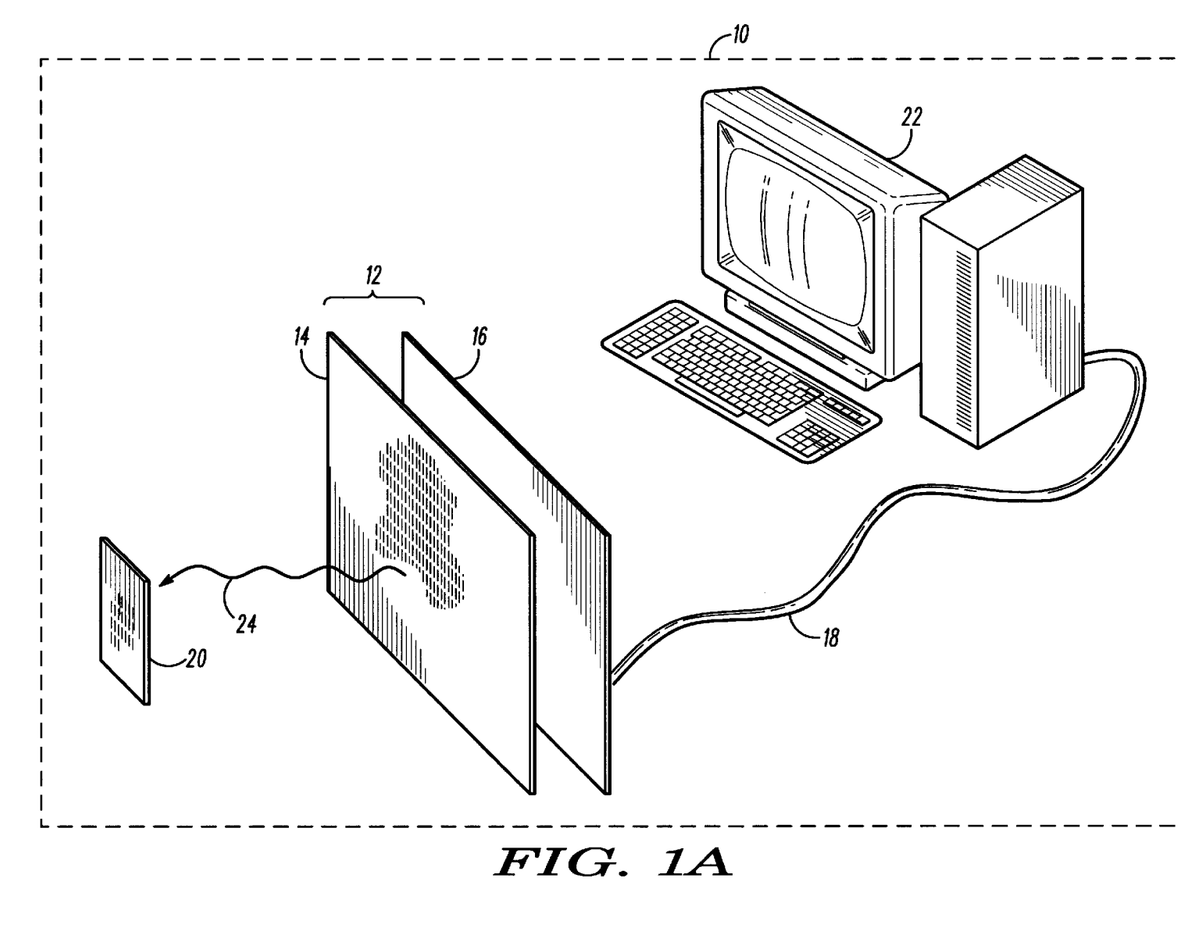
FIG. 1A illustrates an electric field RFID device construction and system configuration.

FIG. 1A is an example of an electric field RFID system 10 having a compact RFID device 12. The RFID device 12 is composed of two basic elements, an exciter electrode (e.g., antenna, plate, etc.) 14 and electronic circuitry 16. The RFID device 12 may be any part of an RFID reader system containing tag excitation circuitry, such as, a tag reader, a tag writer, a tag reader/writer, a tag excitation device (in which the circuitry that performs the tag reading function is located in a separate unit), or any combination thereof. The exciter electrode 14 is a sheet of electrically conductive material. The electronic circuitry 16 contains all of the functional circuitry required to drive the exciter electrode 14, communicate information between a tag 20 and the RFID device 12, and exchange information with a host computer system 22 via an input/output ("I/O") cable 18. Power is provided to the RFID device 12 by the host computer system 22 via the I/O cable 18. The electronic circuitry 16 is commonly assembled on a substrate 17 comprised of a dielectric material, such as, epoxy glass printed circuit board (PCB). Alternatively, the substrate 17 may be made of a wide variety of materials, such as, polymer sheets or films, paper or cardboard, ceramic, etc. Components used in electronic circuitry 16 are interconnected by conductors on substrate 17. The conductors are formed of metals, metal foil, metal film, electrically conductive inks or paints, etc., and may be constructed using any suitable means, such as deposition and etching.

Figure 1B:
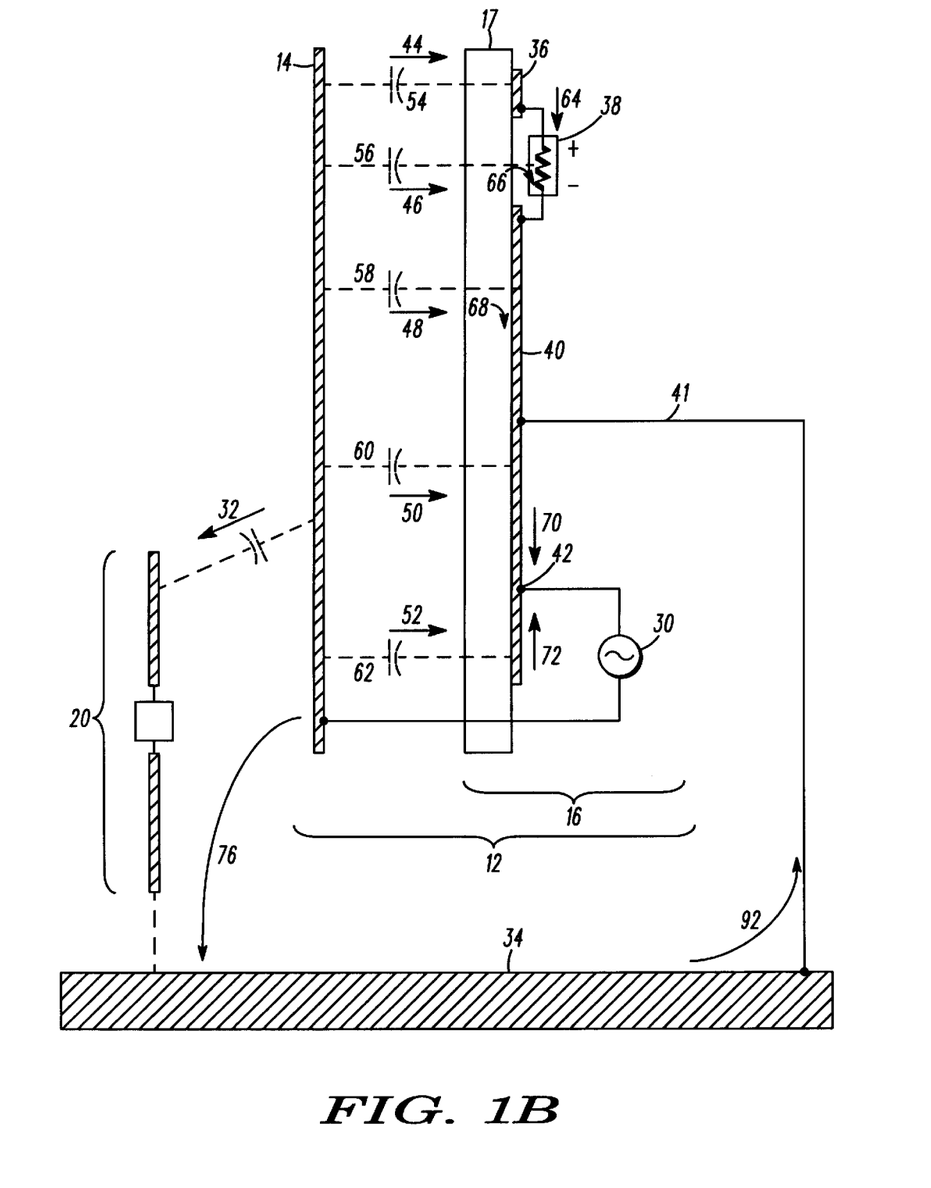
FIG. 1B illustrates a side view of FIG. 1A.

FIG. 1B is a side pictorial view/schematic diagram of the RFID system of FIG. 1A, which represents a monopole electric field RFID system. An exciter voltage source 30 generates a high alternating current ("AC") voltage that is connected to the exciter electrode 14. The exciter electrode 14, driven by the exciter voltage source 30, causes an AC electric field to be radiated outward toward the tag 20. When the tag 20 is close enough to the exciter electrode 14, and sufficient energy is coupled, the tag 20 then begins to function. This causes a small displacement current 32 to flow into the tag 20. Displacement current is that which flows through a dielectric when a time-varying potential exists across the dielectric. Current 32 flows through the tag 20, a common impedance path 34 (e.g., earth ground), and an RFID device reference connection 41, ultimately returning to the exciter voltage source 30 at the exciter voltage source return node 42. Therefore, current 32 provides operating energy for the tag 20. Relatively high voltage levels are required on the exciter electrode 14 in order to produce an adequate magnitude of current 32 when the tag 20 is at long distances from the exciter electrode 14. A receive electrode (not shown) is often located on or near the exciter electrode 14 for the purpose of receiving signals from tags.

It should be noted that FIG. 1B is not drawn to scale, that is, the tag 20 is typically positioned at a much greater distance from the exciter electrode 14 than is the electronic circuitry 16. Parasitic displacement current 76 flows from the exciter electrode 14 to other impedances that are broadly distributed in the environment surrounding the RFID device 12 and common to the RFID device reference connection 41. Parasitic displacement current 76 is due to stray capacitance, and is generally very small in magnitude. In FIG. 1B, the sum of current 32 and current 76 is shown as current 92 as it flows back to RFID device 12 through common impedance path 34 and RFID device reference connection 41.

In FIG. 1B, trace 36, trace 40 and sensitive component 38 (collectively referred to as "circuit elements") provide a simple representation of circuitry on the electronic circuitry 16. Because of their close proximity, significant capacitance exists between the exciter electrode 14 and the circuitry disposed on the electronic circuitry 16. Smaller separations between the exciter electrode 14 and the electronic circuitry 16 increase this capacitance. The exciter voltage source 14 is also located on the electronic circuitry 16, and the exciter voltage source return node 42 is common with many elements on the electronic circuitry 16 (e.g., circuit ground). Because of the AC potential difference between the exciter electrode 14 and circuit elements 36, 38 and 40, displacement current flows through the dielectric space between the exciter electrode 14 and the electronic circuitry 16. For illustration purposes, this displacement current is represented by lumped currents 44, 46, 48, 50, and 52, which flow respectively through lumped capacitances 54, 56, 58, 60 and 62. It will be appreciated by those skilled in the art that these capacitances and displacement currents are actually distributed over the entire area that is common to the exciter electrode 14 and the electronic circuitry 16, and are not necessarily discrete elements as illustrated in FIG. 1B.

Displacement currents 44, 46, 48, 50 and 52 respectively become conduction currents 64, 66, 68, 70 and 72 in circuit elements 36, 38 and 40 as the currents return to exciter voltage source 30 at the exciter voltage source return node 42. Because of the high exciter voltage and close spacing, the displacement currents (and therefore the resulting conduction currents) may become relatively large. As shown in FIG. 1B, displacement current 44 is injected into trace 36, becomes the conduction current 64, which in turn flows through sensitive component 38, and then into trace 40. Therefore, displacement current 44 causes noise voltage 69 to be developed across sensitive component 38; introducing signals that significantly reduce the performance of RFID device 12.

FIG. 1B further illustrates that displacement current 66 may be injected directly into sensitive component 38. As the distance from the exciter voltage source return node 42 decreases, conduction current in the trace 40 increases as a result of cumulative displacement current injection. Because the traces on the electronic circuitry 16 do not have zero impedance, the displacement currents cause voltage gradients to develop on the traces. This causes, for example, circuit ground to have significantly different potentials at different locations on the electronic circuitry 16. This is another way in which displacement current injection can cause noise voltages that impair reader performance.

As can be appreciated by those skilled in the art, there are numerous components and traces on the electronic circuitry 16 that may be injected by displacement currents as previously described. Because these many components and traces comprise a wide variety of impedances (large, small, linear, non-linear, real, complex, etc.) to the exciter voltage source return node 42, a wide range of noise voltages and currents exist, many of which occur in circuitry that is particularly sensitive. Many varied responses to noise exist as a result, which significantly impacts reader performance and stability. Because of these problems, readers may be unable to satisfy the needs of certain applications.

The adverse effects from displacement current injection may be reduced by significantly increasing the separation between the exciter electrode 14 and the electronic circuitry 16. This solution, however, is not acceptable for applications requiring compact readers, since very large separations are required to minimize the problem. Extensive layout and circuit modifications may be performed, but an iterative approach (trial and error) is usually required, and ultimately provides only marginal performance improvement. Extensive filtering schemes do not help significantly because displacement current injection occurs everywhere, not just in signal paths. The many and varied impedance paths in a reader can react to the displacement currents, introducing complex electromagnetic emission and susceptibility problems on top of performance problems. The approaches mentioned above usually add cost and complexity, and consume space, with little return in performance.

Figure 2:
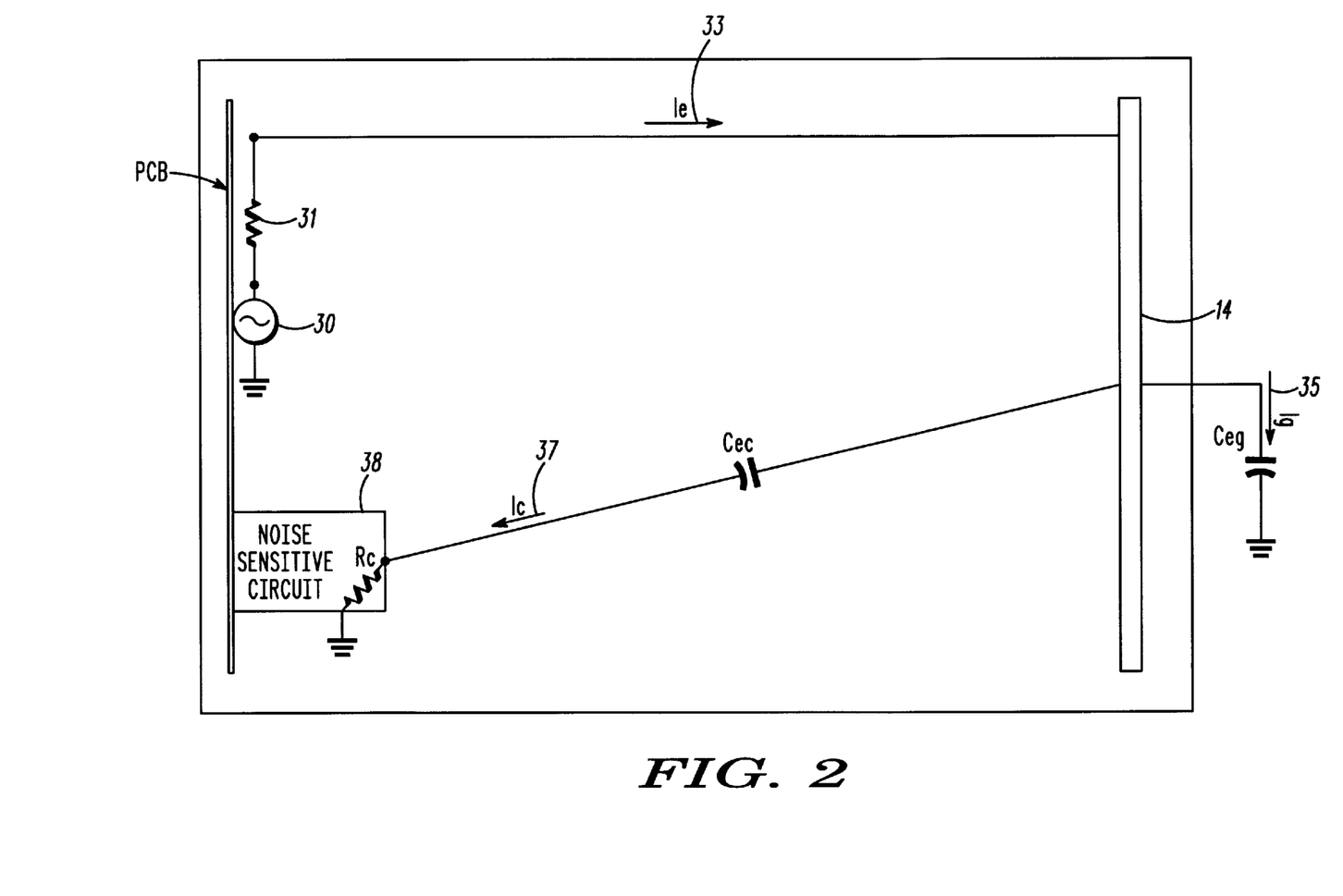
FIG. 2 illustrates an RFID device and tag system.

In addition, FIG. 2 illustrates several elements of an RFID device including exciter source impedance (Re) 31, exciter current (Ie) 33, and noise current (Ic) 37. Note that the sensitive circuitry 36, 38, 40 are placed on the side of the printed circuit board that is facing the exciter electrode 14. The sensitive circuitry 36, 38, 40 can also be directly exposed to the exciter electrode 14 if the printed circuit board is mounted at a variety of other angles relative to the exciter electrode 14, including a ninety-degree angle or perpendicular.

The exciter voltage source 30 generates a high voltage (Ve) and is connected through a source impedance (Re) 31 to an exciter electrode 14. The source impedance (Re) 31 is usually internal to the exciter voltage source 30 but the source impedance (Re) 31 may also be a device external, or in addition to, the exciter voltage source 30. The source impedance (Re) 31 may be resistive, capacitive, inductive, or any combination thereof. A current (Ie) 33 primarily flows from the exciter voltage source 30, through the source impedance (Re) 31 to the exciter electrode 14. The current (Ie) 33 is divided between a current that flows out of the exciter electrode 14 to ground (Ig) 35, a noise current (Ic) 37 that flows into the sensitive circuitry 36, 38, 40, and other less-significant paths not shown in FIG. 2. The noise current (Ic) 37 creates an undesirable noise voltage across the sensitive circuitry impedance, Rc.

One of the methods that may be used to attenuate the noise current (Ic) 37 present in the sensitive circuitry 36, 38, 40 is to add shielding around the sensitive circuitry 36, 38, 40, also known as a Faraday Box. The Faraday Box, however, is bulky and expensive, and is unacceptable for many hand-held RFID devices.

Thus, there exists a need to provide an apparatus and method for minimizing undesirable exciter displacement current (i.e., noise) in the electronic circuitry of RFID devices, and a low-cost solution which enables compact electric field RFID devices to function well and predictably in a wide variety of applications.

BRIEF DESCRIPTION OF THE DRAWINGS

A preferred embodiment of the invention is now described, by way of example only, with reference to the accompanying drawings in which.

DETAILED DESCRIPTION OF THE PREFERRED EMBODIMENTS

The following embodiments are described as being applied to monopole electric field RFID devices, while the concepts can be applied to dipole electric field RFID devices as well. A monopole electric field RFID device has a single exciter electrode driven by a voltage source that is referenced to an impedance path that is common with the environment in which an electric field tag is being used. The tag has two electrodes; one of which is electrically coupled to the common impedance path with the RFID device; the coupling impedance being significantly lower than the reactance of the small capacitance that exists between the exciter electrode and the second tag electrode. The coupling impedance may be resistive, capacitive, inductive, or any combination thereof. In the monopole configuration, displacement current used to activate the tag is limited primarily by only the small capacitance existing between the exciter electrode and the tag. Because the current return path is relatively efficient, tag operating distance, or read range, is maximized.

Dipole electric field RFID devices consist of two exciter electrodes whose voltages are opposite in polarity but balanced about a common impedance path such as earth ground or the chassis of equipment. Dipole systems do not require the need for preferential impedance coupling of one tag electrode to a common impedance of the system, although feasible. The total impedance between exciter electrode and tag electrodes, however, is much larger in dipole RFID systems than in monopole RFID systems, so tag activation distance is substantially reduced.

Figure 3A:
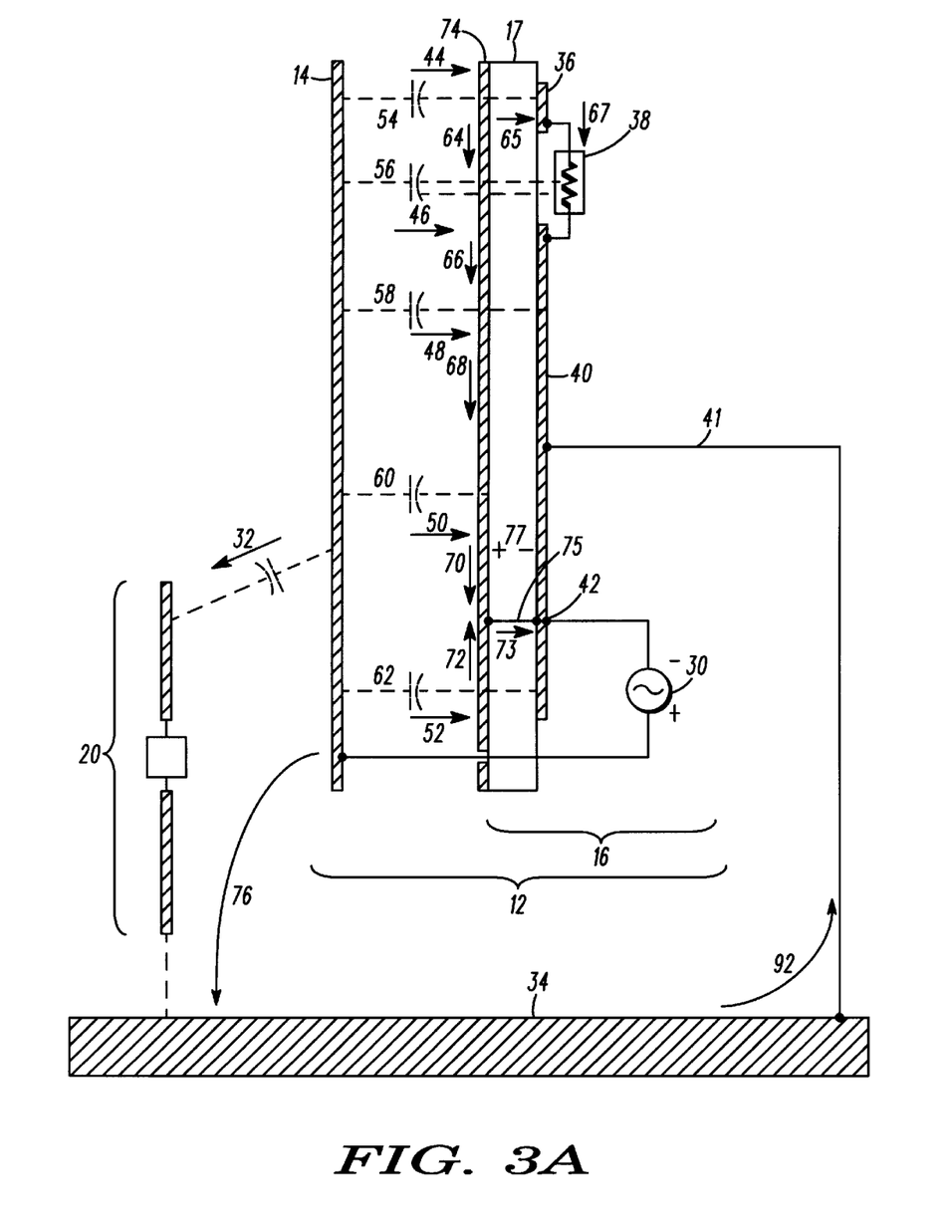
FIG. 3A illustrates a first side view of FIG. 1A incorporating a control surface in accordance with a first preferred embodiment of the present invention.
Figure 3B:
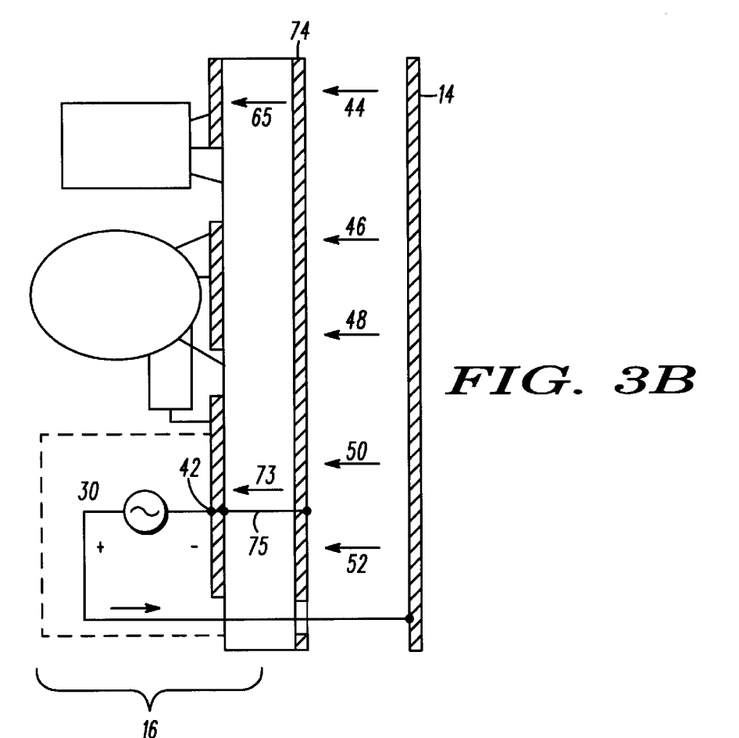
FIG. 3B illustrates a second side view of FIG. 1A incorporating a control surface in accordance with the first preferred embodiment of the present invention.

Referring now to the first preferred embodiment of the present invention, FIGS. 3A and 3B illustrate a displacement current control surface ("control surface") 74 being introduced into the system of FIG. 1A. The control surface 74 may be two-dimensional (i.e., substantially flat) as well as three-dimensional. Depending on the application, the control surface 74 may be any shape or size, and may or may not have openings. The control surface 74 may use a wide range of conductive materials, such as, for example, metal sheet, metal foils and films, electrically conductive ink and paints, and plastics loaded with electrically conductive materials.

The control surface 74 covers the area of, and is insulated from, the electronic circuitry 16, by an air space or a dielectric material. The dielectric isolation can be achieved by mounting the control surface 74 at a fixed separation from the substrate containing the electronic circuitry 16. Alternatively, the control surface 74 may be attached to a dielectric material that is in turn attached to the electronic circuitry 16. The substrate 17 may be composed of one or more electrically non-conducting materials, such as, glass epoxy printed circuit board, polymer sheet or film, ceramic, paper or cardboard, dielectric gasses, a vacuum, and many other materials.

The control surface 74 preferably has one dedicated electrical termination to the exciter voltage source return node 42 of the exciter voltage source 30 used to generate the electric field ("E-field") 24, wherein the exciter voltage source 30 is disposed on the electronic circuitry 16. The control surface 74 controls how and where the displacement current is returned to the exciter voltage source 30 as a conduction current. The control surface 74 acts as a capacitor plate, and by virtue of its termination 75, displacement current flows efficiently and directly back to the exciter voltage source 30. Other than the conductor forming termination 75, no other electrical connections to the control surface 74 exist in the preferred embodiment, thereby guaranteeing that the spatial distribution of the "collected" current is controlled and is not coupled adversely into the circuit elements 36, 38, 40 on the electronic circuitry 16.

As shown in FIGS. 3A and 3B, the sum of all displacement current flows through the control surface 74 and is routed directly to the exciter voltage source return node 42 through termination 75 as conduction current 73. Because the impedance of termination 75 cannot be perfectly zero, a small voltage 77 develops across termination 75. The voltage 77 will cause a small residual displacement current 65 to flow between the control surface 74 and the circuit elements of electronic circuitry 16. The small residual displacement currents will in turn cause small residual conduction current 67 to flow through the sensitive component 38 and conducting traces 36, 40 on electronic circuitry 16. Extremely sensitive circuitry may still react to residual conduction currents that remain. Low impedance termination of the control surface 74 is essential to minimizing the voltage 77. It is preferable that termination 75 is as short and direct to the exciter voltage source return node 42 as possible.

If the control surface 74 of the present invention has a high conductivity, voltage gradients across the control surface 74 are minimized, therefore optimizing its effectiveness. Lower conductivity materials, however, may also be used successfully, provided that the electronic circuitry 16 layout is designed with this in mind.

Figure 3C:
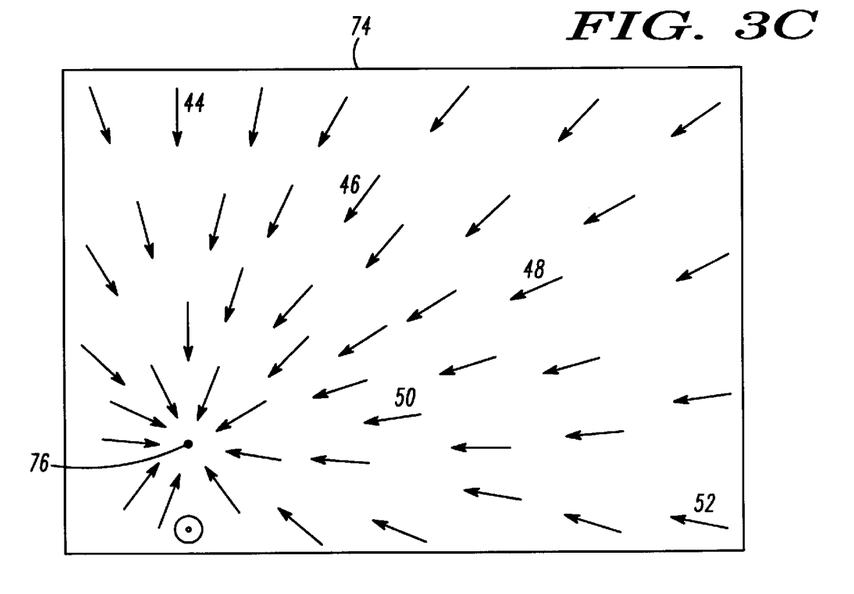
FIG. 3C illustrates a front view of FIGS. 3A and 3B illustrating the flow of displacement currents in accordance with the first preferred embodiment of the present invention.

FIG. 3C illustrates a front view of the control surface 74 as viewed through the exciter electrode 14. Arrows represent conduction current flow in the control surface 74 resulting from displacement current that is injected by the exciter electrode 14. The termination point 76 is one end of termination 75, and is the focal point of all conduction current flowing out of the control surface 74 as the conduction current returns to the exciter voltage source return node 42.

Figure 4:
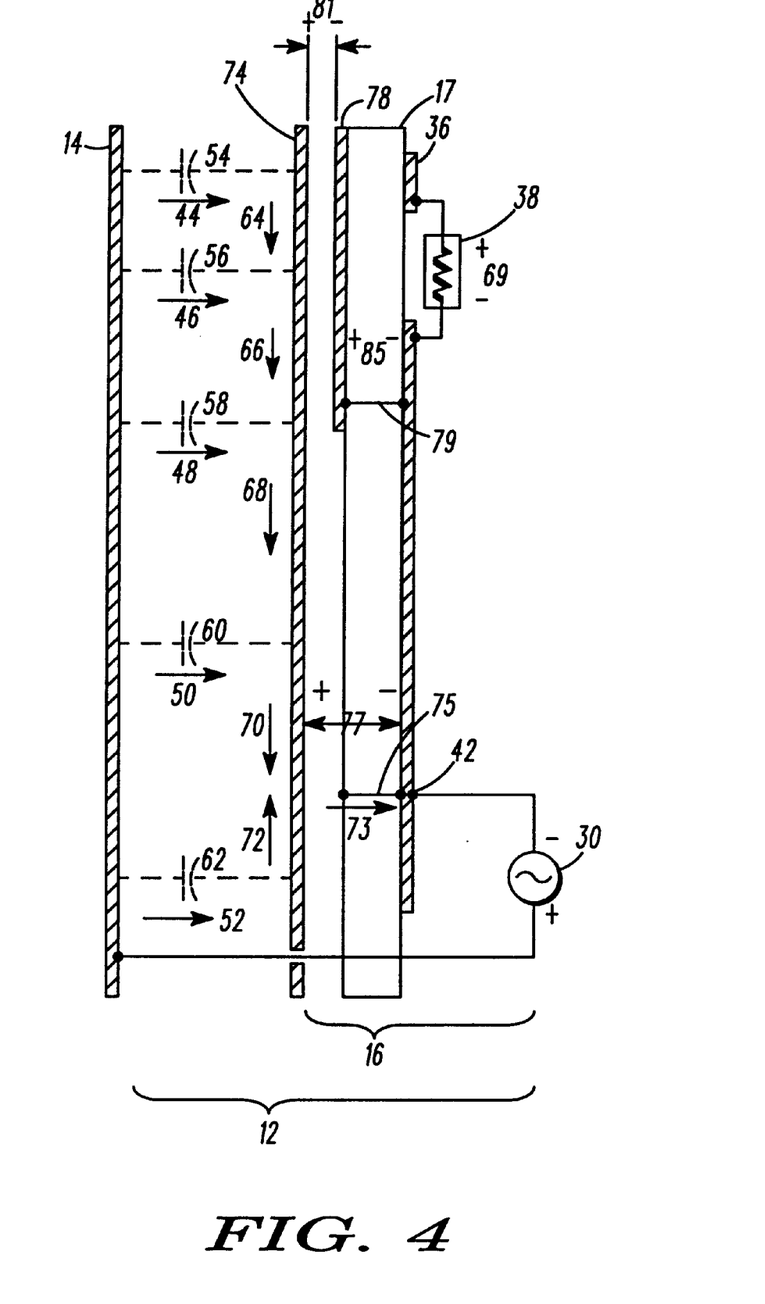
FIG. 4 illustrates a side view of FIG. 1A incorporating a displacement current control surface and a conducting surface (e.g., ground plane) in accordance with a second preferred embodiment of the present invention.

Referring now to a second preferred embodiment of the present invention, FIG. 4 is similar to FIG. 3A, except that a conducting surface (e.g., ground plane) 78 is added under sensitive component 38 on electronic circuitry 16. It should be noted that the conducting surface 78 is not electrically connected to the control surface 74 and that a dielectric or a gap exists between them. The conducting surface 78 can be composed of a wide variety of electrically conductive materials such as metals, conductive ink, conductive paint, organic conductors, semiconductors, etc. The conducting surface 78 may be disposed in or on the electronic circuitry 16 using a variety of methods, such as within or on the surface of a printed circuit board or substrate, such as paper, plastic, glass, epoxy, or other dielectric materials, with adhesive, paint, spray, or evaporation techniques.

The control surface 74 and the conducting surface 78 may share the same electrical common or ground at some point in the electronic circuitry 16, but they are not connected directly together. The control surface 74 and the conducting surface 78 may also be at different potentials, but in general, the AC potential difference between them should be kept low for best results.

As shown in FIG. 4, conducting surface 78 is electrically connected to the electronic circuitry common by termination 79. Voltage 81 develops across the control surface 74 and conducting surface 78, and is approximately the sum of voltage 77 and voltage gradients which develop in the control surface 74 due to its impedance. Voltage 81 causes a small displacement current 83 to flow through the capacitance that exists (not shown) between the control surface 74 and the conducting surface 78. The impedance of termination 79, however, is much lower than the reactance of the capacitance between the control surface 74 and the conducting surface 78, so the voltage 85 approaches zero. Virtually all displacement current is routed through controlled means back to the exciter voltage source 30, so it cannot couple noise into sensitive component 38; thus yielding a noise voltage 69 of essentially zero in this configuration. The configuration of FIG. 4 is ideal because it provides the optimum isolation from exciter noise.

Although not required, it will be appreciated that the control surface 74 and the conducting surface 78, for example, can both be integrated into a single substrate such as a printed circuit board (PCB) used in electronic circuitry 16. This implementation provides compact size, ease of manufacturing, low cost, and controlled electrical characteristics.

It should be noted that when the present invent invention is implemented, the read range of the RFID device increases by nearly 270%. For example, if there is 0.2 inch spacing between exciter electrode 14 and electronic circuitry 16, the RFID device 12 has a read range of eight inches when implementing the second embodiment of the present invention, as compared to three inches when not implementing the present invention. It should be noted that the configuration of the RFID device without the present invention may utilize a ground plane (i.e., conducting surface) located underneath many sensitive components to provide an electrical reference for them. Because displacement current is injected directly into the ground plane, however, voltage gradients are developed across the ground plane, causing excessive ground noise and poor performance. It should also be noted that the addition of the control surface 74 is most effective when the control surface is properly terminated to the exciter voltage source return node 42. Because of the compact configuration of the RFID device 12 (i.e., the spacing between the exciter electrode 14 and the electronic circuitry 16 was small), conduction current that flows as a result of exciter electrode displacement current is high, thereby causing excessive noise in sensitive components. Proper implementation of the present invention demonstrates a significant reduction in noise, and therefore a dramatic improvement in performance.

Figure 5:
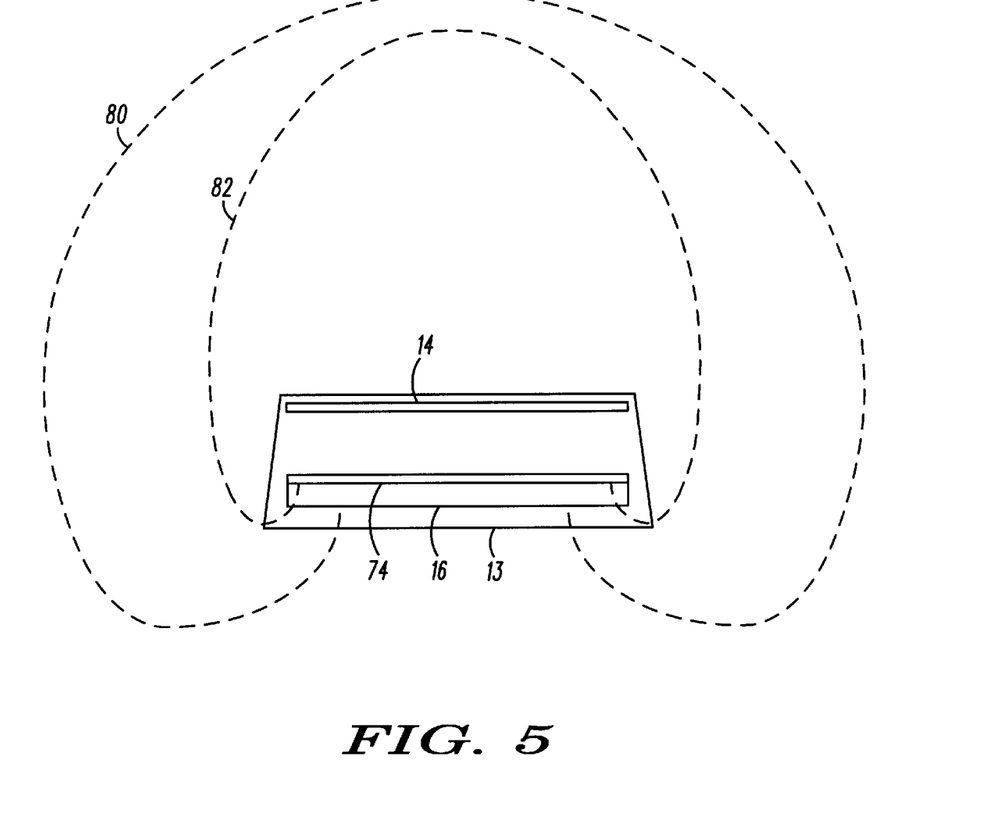
FIG. 5 illustrating an electric field radiation pattern in accordance with the preferred embodiments of the present invention.

FIG. 5 illustrates the effect of the present invention upon the radiated field pattern with and without the present invention. The E-field pattern is significantly pulled in towards the boundaries of the RFID device 12 reducing potential undesired interactions with other nearby electronic systems. Without the control surface 74, E-field lines 80 terminate on sensitive component 38 and traces 36, 40 of the electronic circuitry 16, and extend well to the sides and rear of the RFID device 12. The present invention is useful for the localization of read zones 82 when multiple readers are placed relatively close to each other, thereby preventing multiple readers from reading a tag when it is presented only to one reader (i.e., preventing cross-reading). Similarly, the narrowed E-field pattern is useful when focused reading of tags is desired to prevent, for example, the inadvertent reading of tags that are presented to neighboring RFID devices.

When the size of the control surface 74 is similar to that of the exciter electrode 14, for example, it will dominate the field pattern of the RFID device 12, making the RFID device 12 insensitive to metal placed behind it. The implementation of the present invention enables RFID device 12 to be used in a wide variety of mounting configurations without adversely affecting performance. The ability of the present invention to constrain and control the electric field pattern has also been shown to reduce undesired radiated and conducted emissions, better enabling the RFID device 12 to pass regulatory electromagnetic interference (EMI) compliance standards. Further, because the exciter electrode 14 usually has an area that is comparable to the size of the finished product, it can be an efficient means for external radio frequency ("RF") radiation to couple into the RFID device 12, thereby reducing performance. The present invention has proven effective in reducing susceptibility problems by intercepting and diverting such signals away from sensitive parts of the circuitry (e.g., sensitive component 38).

Figure 6A:
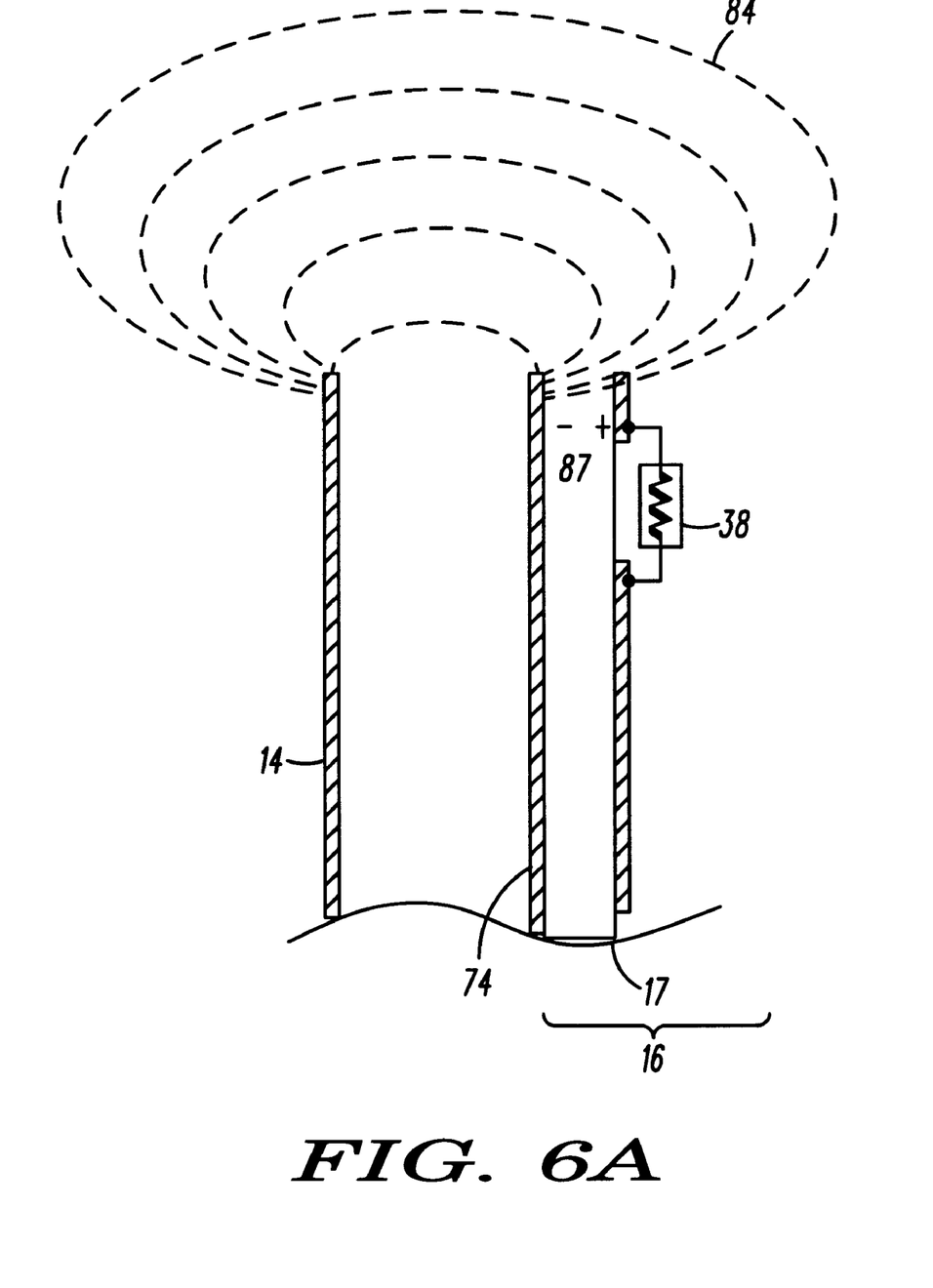
FIG. 6A illustrates fringe fields existing at a boundary (edge) of an RFID device.

FIG. 6A illustrates the fringing electric fields 84 that exist at the boundaries of a RFID device 12 incorporating the present invention. Fringe fields 84 terminate on and couple noise voltage 87 to trace 36 and sensitive component 38 that is located near the boundaries. It is important to note that the fringe fields 84 exist without the control surface 74, but their shape, distribution and intensity will vary according to the placement of traces and components on the electronic circuitry 16. Without the control surface 74, displacement current induced noise is likely to be the dominant noise source, rather than the fringe fields.

Figure 6B:
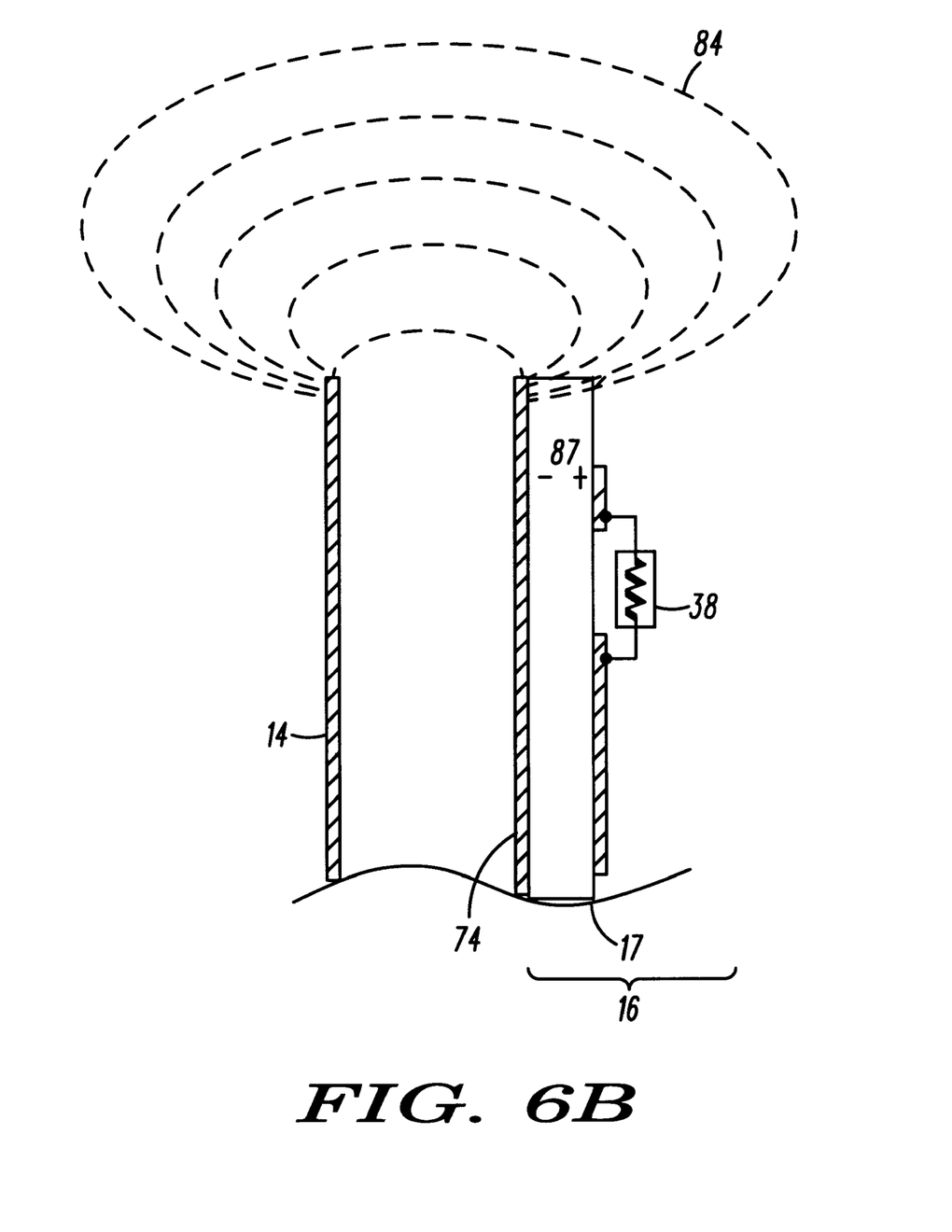
FIG. 6B illustrates a first configuration designed to avoid adverse effects caused by fringe fields of FIG. 6A at the RFID device boundaries in accordance with the preferred embodiments of the present invention.

FIGS. 6B, 6C, 6D and 6E illustrate various configurations of reducing adverse effects caused by fringe fields at reader boundaries as shown in FIG. 6A. As shown in FIG. 6B, the sensitive component 38 and trace 36 are moved away from the edge of the electronic circuitry 16 in order to avoid the fringing electric fields 84.

Figure 6C:
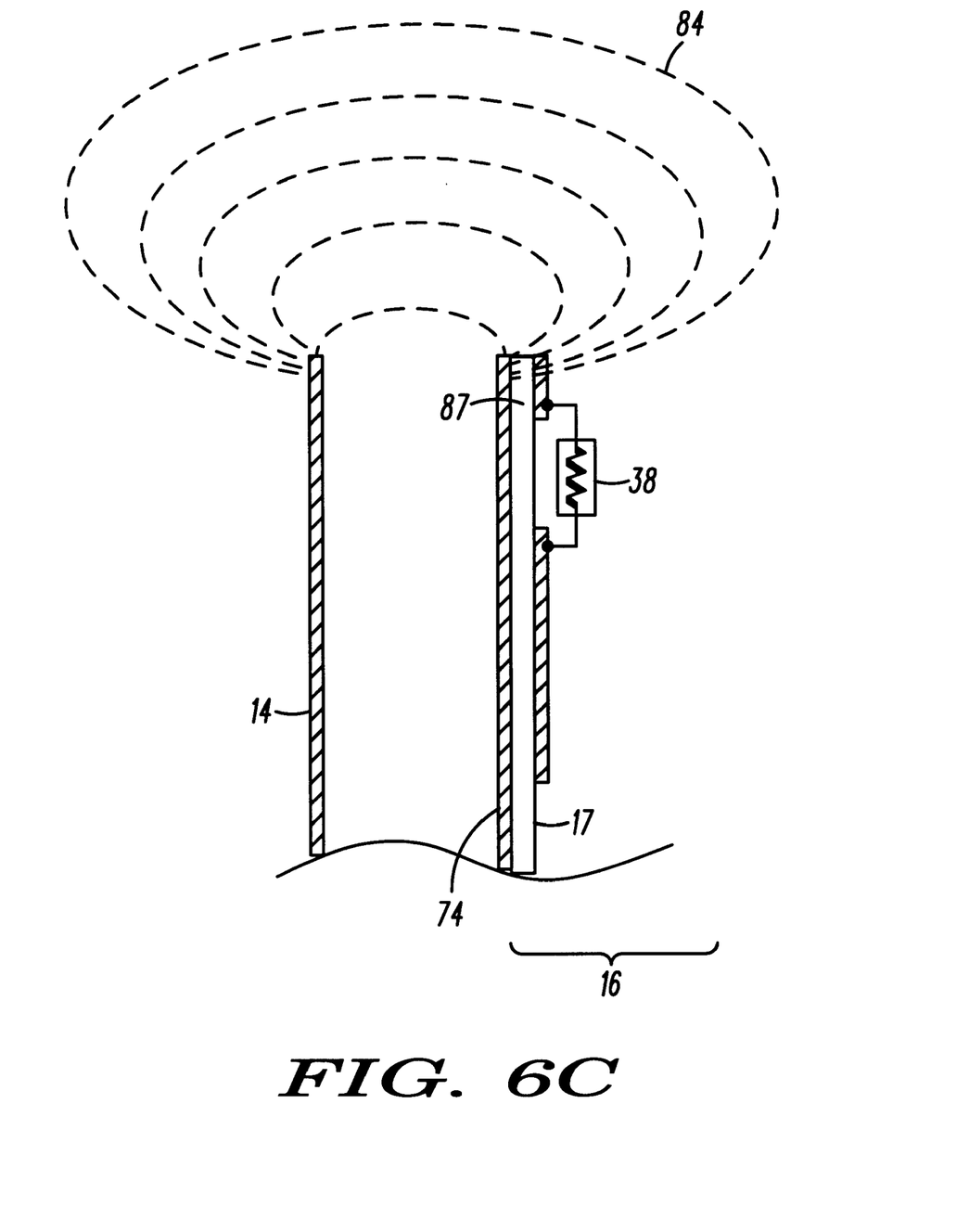
FIG. 6C illustrates a second configuration designed to avoid adverse effects caused by fringe fields of FIG. 6A at the RFID device boundaries in accordance with the preferred embodiments of the present invention.

As shown in FIG. 6C, noise voltage 87 that is coupled onto sensitive component 38 and trace 36 decreases from the value of FIG. 6A when sensitive component 38 and trace 36 are positioned closer (reduced spacing) to the control surface 74.

Figure 6D:
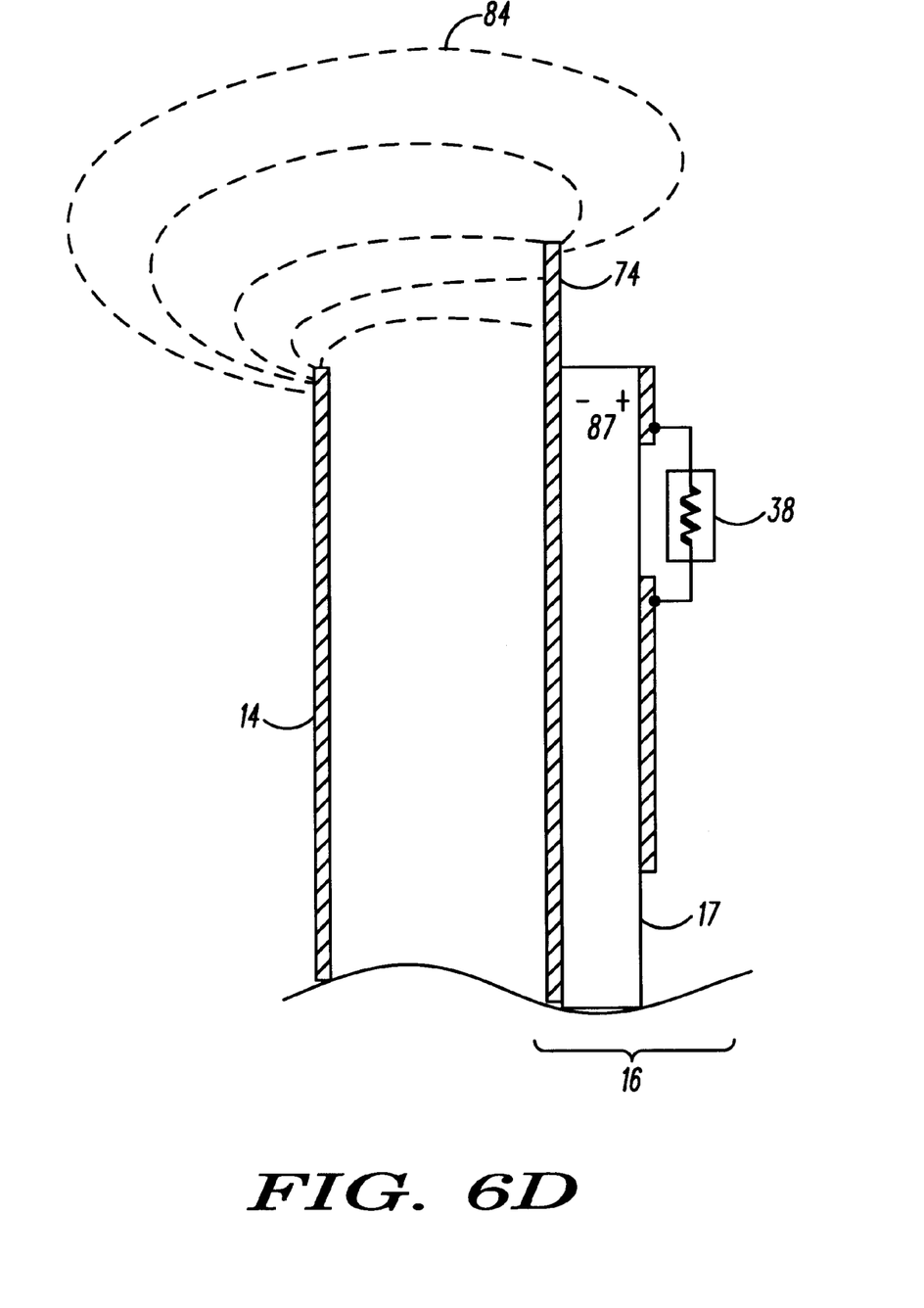
FIG. 6D illustrates a third configuration designed to avoid adverse effects caused by fringe fields of FIG. 6A at the RFID device boundaries in accordance with the preferred embodiments of the present invention.

As shown in FIG. 6D, the control surface 74 may be extended beyond the boundaries of the exciter electrode 14 and the electronic circuitry 16. Such a configuration allows the fringing electric fields 84 to terminate away from sensitive component 38 and trace 36.

Figure 6E:
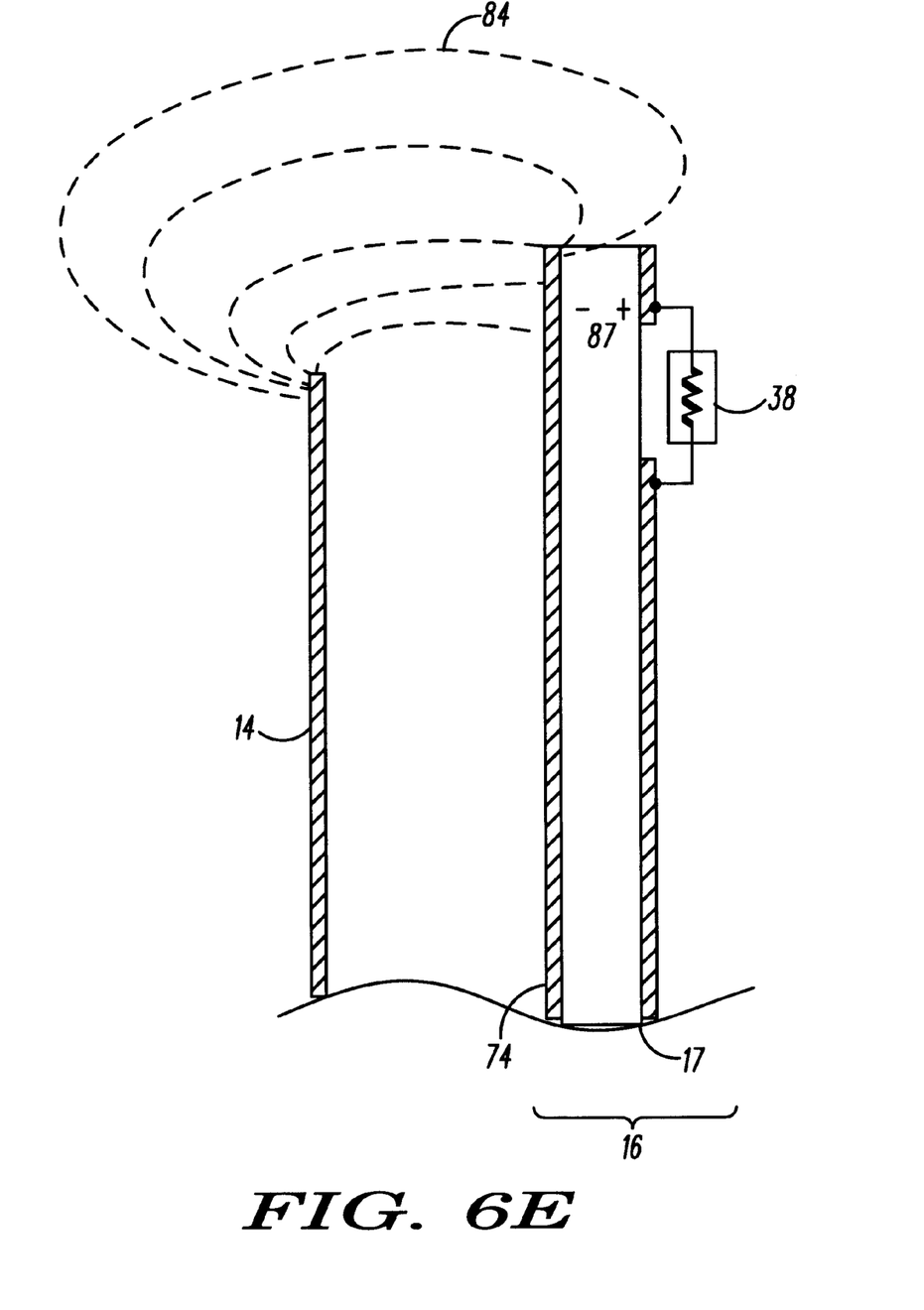
FIG. 6E illustrates a fourth configuration designed to avoid adverse effects caused by fringe fields of FIG. 6A at the RFID device boundaries in accordance with the preferred embodiments of the present invention.

As shown in FIG. 6E, the size of the exciter electrode 14 may be reduced, pulling its edges away from the boundaries of the RFID device 12. Fringing electric fields 84 will terminate away from sensitive component 38 and trace 36 on the electronic circuitry 16.

Referring to yet a third embodiment of the present invention, referred to as a noise shunt method and apparatus, the output impedance of the exciter voltage source is raised to higher levels than is usually thought of as desirable in typical electronic designs. The third embodiment places a low impedance noise shunt beneath the components of interest. The noise shunt performs better if it is placed between the exciter electrode and the noise-sensitive circuit, but placing it on the far side of the noise sensitive circuit results in the cost/size savings sought by practitioners of the present invention.

The noise shunt method would typically be used when it is desired to have the active circuitry directly facing the noise source without the benefit of low impedance control surfaces as described previously. One example of this occurrence is when the noise-sensitive electronics is placed on both sides of a printed circuit board.

Figure 7:
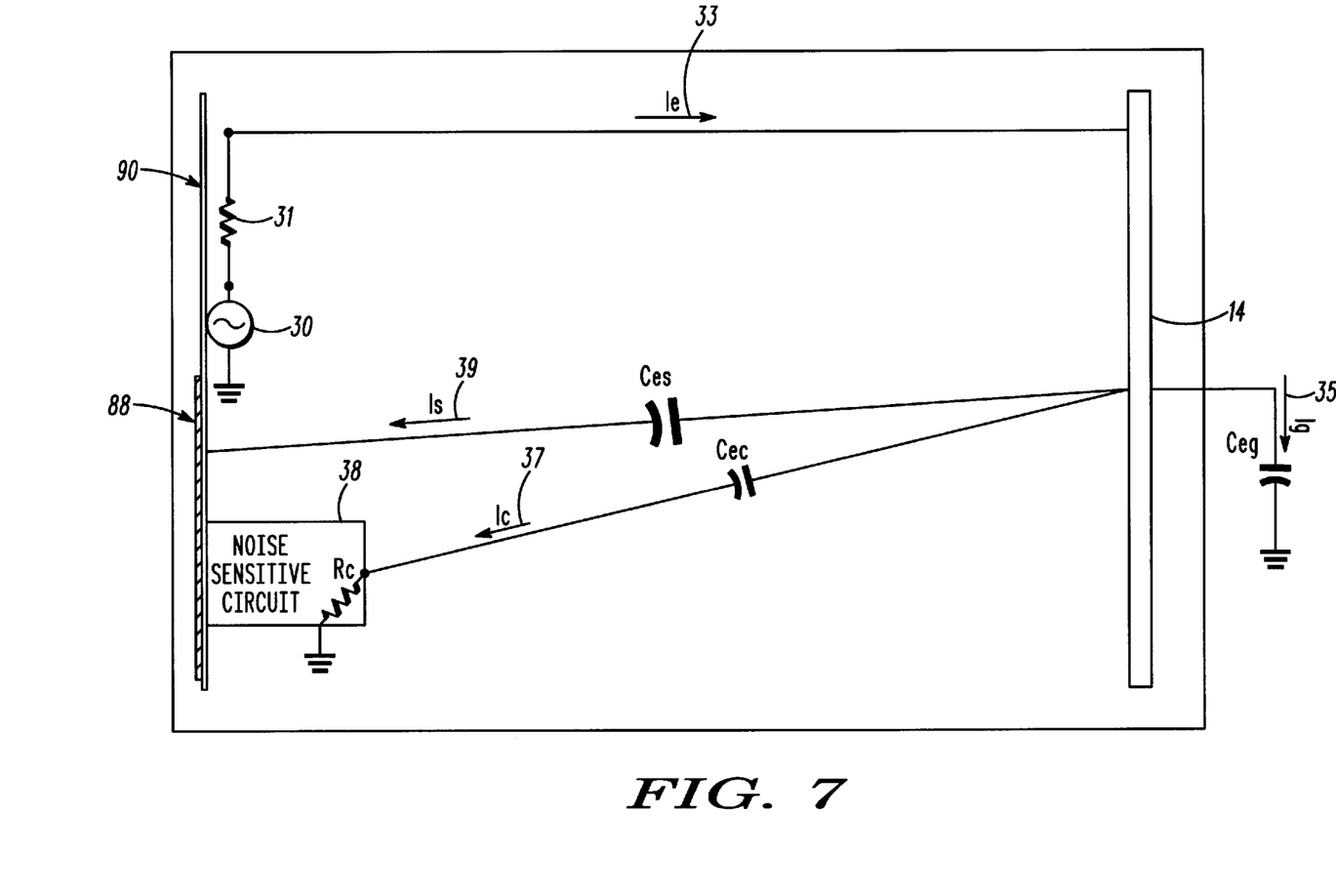
FIG. 7 illustrates a noise shunt apparatus in accordance with a third embodiment of the present invention.

FIG. 7 illustrates the RFID device 12 including an exciter source impedance (Re) 31, exciter current (Ie) 33, ground current (Ig) 35, noise current (Ic) 37, and shunted noise current (Is) 39, when the noise-sensitive circuitry 38 is protected by the noise shunt 88 in accordance with the third embodiment of the present invention. As stated above, the monopole configuration is shown, however, this embodiment may also be applied to dipole configurations.

The exciter voltage source 30 generates a high voltage (Ve) and is connected through a source impedance (Re) 31 to the exciter electrode 14. It is important to note that the exciter voltage source 30 has a relatively high source impedance (Re) 31, typically on the order of 500 to 10,000 ohms. The source impedance (Re) 31 may be internal or external to the exciter voltage source 30. An example of a low source impedance driver with higher external associated impedance would be a high voltage operational amplifier with a resistor in series with its output node. An example of an exciter voltage source 30 that incorporates the source resistance internally would be a driven step-up transformer with a primary: secondary turns ratio of 1:15. The source impedance (Re) 31 may be resistive, capacitive, inductive, or any combination thereof.

A current (Ie) 33 primarily flows from the exciter voltage source 30, through the source impedance (Re) 31 to the exciter electrode 14. The exciter voltage source (Ve) 30 and the source impedance (Re) 31 may be replaced by other source configurations, such as a constant current source. The current (Ie) 33 is divided between the current (Ig) 35 that flows from the exciter electrode 14 to ground, the noise current (Ic) 37 that flows into the noise-sensitive circuit 38, and the current (Is) 39 that flows from the exciter electrode 14 and associated wiring to the low impedance noise shunt conductor 88, and other less-significant paths not shown in FIG. 7. The ground current (Ig) 35, the noise current (Ic) 37, and the shunt current (Is) 39 may also flow from other circuitry not shown in FIG. 7 that has an associated high impedance.

The low impedance shunt conductor 88 may be composed of a variety of materials such as metals, conductive ink, organic conductors, or semiconductors. The low impedance shunt conductor 88 is disposed in the reader/writer system. The low impedance shunt conductor 88 may be disposed using a variety of methods, such as within or on the surface of a printed circuit board or substrate 90 (such as paper, plastic, glass, epoxy, or other dielectric materials), with adhesive, paint, spray, or evaporation. The shunt conductor 88 can be a ground plane or a reference plane in the printed circuit board or substrate 90. The preferred embodiment uses a ground plane as a low impedance shunt conductor 88 on the second layer of a four-layer printed circuit board 90 that carries the sensitive circuitry 38 on the first layer. Preferably, the first layer with the sensitive circuitry 38 is facing the exciter electrode 14. The third preferred embodiment, however, does not utilize methods and apparatuses as described in the first and second preferred embodiments described above, nor does it utilize a Faraday Box or other types of shielding.

While the source impedance (Re) 31 would usually be considered a liability in inductive applications as well as in most electronic designs, it can actually be a benefit in electric field RFID devices. The source impedance (Re) 31 must be high enough so that it significantly limits the current (Ie) 33 when the low impedance noise shunt 88 is utilized. The current (Ie) 33 is the sum of several currents such as (Ig) 35, (Ic) 37, and (Is) 39. The currents (Ig) 35, (Ic) 37, and (Is) 39 are dependent upon the impedances Ceg, Cec, and Ces, respectively. The impedances Ceg, Cec, and Ces may be composed of capacitance, inductance, resistance, or any combination thereof. In the preferred embodiment, the impedances Ceg, Cec, and Ces are modeled as primarily capacitance.

Since the source impedance (Re) 31 is high, the current (Ie) 33 will be limited even though additional capacitance is added by the low impedance noise shunt conductor. In FIG. 7, Ie=Ig+Ic+Is since they are all connected at a single node, the exciter electrode 14. The currents (Ig) 35, (Ic) 37, and (Is) 39 all share a common impedance path to the exciter voltage source 30. In the preferred embodiment, this common impedance path is ground. The addition of the shunt capacitance, Ces, slightly increases the exciter current (Ie) 33 but not very much. Given that the current (Ie) 33 is limited, it becomes possible to shunt some of the noise current (Ic) 37 away from the noise-sensitive circuit 38. Though the noise current (Ic) 37 is not eliminated entirely, a significant part of the noise current is diverted in the noise shunt 88, thus increasing the shunt current (Is) 39.

When using this invention, it should be noted that the source impedance of the exciter is high and that the effective exciter voltage seen on the exciter electrode 14 may be affected by any addition of capacitance or other impedance, such as by the addition of the ground plane 88 or a large metallic object in the vicinity of the RFID device.

The three embodiments of the present invention described above were described for implementation into an electric field RFID device. The three embodiments, however, are also able to be implemented into a magnetic field RFID device (and any combinations thereof) in which voltages that can cause adverse displacement currents may exist. In a magnetic field RFID device, typically the exciter element 14 is a coil, and high voltages may be present on the coil or exciter source, thereby permitting portions of the electronic circuitry to cause undesired displacements currents to flow. In this configuration, the control surface 74, the conducting surface 78, the noise shunt 88, and/or any combination thereof will be added to the magnetic field RFID device in a similar manner as described above.

While the invention has been described in conjunction with a specific embodiment thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description.

For example, the control surface 74 can be implemented as a conducting layer of a printed circuit board; it can be integrated into the electronic circuitry 16, or integrated as part of the exciter electrode 14.The control surface, exciter electrode and electronic circuitry 16 can be integrated such that a single-board RFID device is developed. The capacitance resulting from the presence of the control surface can also be used as an intentional circuit element in an RFID device. Thus, it should be understood that the invention is not limited by the foregoing description, but embraces all such alterations, modifications and variations in accordance with the spirit and scope of the appended claims.

We claim:

1. A radio frequency identification (RFID) device having displacement current control, the RFID device comprising:
   a voltage source having a current return node;
   an exciter electrode coupled to the voltage source;
   the RFID device having electronic circuitry;
   a displacement current control surface (DCCS) placed between the exciter electrode and the electronic circuitry; and
   a dielectric between the DCCS and the electronic circuitry, wherein the DCCS is electrically terminated to the current return node of the voltage source.

2. The RFID device of claim 1 further comprising a conducting surface placed between the DCCS and the electronic circuitry, wherein the conducting surface is used as a voltage reference for the electronic circuitry.

3. The RFID device of claim 1 wherein the DCCS uses conductive materials selected from a group consisting of: metal sheet, foil, film, ink, paint, and loaded plastic.

4. The RFID device of claim 1 wherein the DCCS is substantially flat.

5. The RFID device of claim 1 wherein the DCCS is three-dimensional.

6. The RFID device of claim 1 wherein the electronic circuitry is assembled onto a substrate selected from a group consisting of: printed circuit board, polymers, dielectric, paper, glass, epoxy, and semiconductor material.

7. The RFID device of claim 6 wherein the DCCS is integrated into the substrate.

8. The RFID device of claim 6 wherein the DCCS and a conductive surface is integrated into the substrate.

9. A radio frequency identification (RFID) device having displacement current control, the RFID device comprising:
   a conductive material having a first impedance;
   the RFID device having electronic circuitry; and
   an exciter element having a second impedance, wherein the second impedance is greater than the first impedance, and wherein the exciter element generates a current that is partially diverted by the conductive material,
   wherein the conductive material, electronic circuitry, and the exciter element are connected via a common impedance path.

10. The RFID device of claim 9 wherein the conductive material is positioned in close proximity to the electronic circuitry.

11. The RFID device of claim 9 wherein the electronic circuitry is assembled onto a substrate selected from a group consisting of: printed circuit board, polymers, dielectric, paper, glass, epoxy, and semiconductor material.

12. The RFID device of claim 11 wherein the conductive material is positioned on the substrate.

13. The RFID device of claim 11 wherein the conductive material is manufactured within the substrate.

14. The RFID device of claim 9 wherein the exciter element is external to the electric field RFID device.

15. A method of controlling displacement current in a radio frequency identification (RFID) device, the method comprising the steps of:
   providing an exciter electrode;
   providing electronic circuitry;
   positioning a displacement current control surface (DCCS) placed between the exciter electrode and the electronic circuitry; and
   providing a dielectric between the DCCS and the electronic circuitry, wherein the DCCS is electrically terminated to a current return node of a voltage source used to generate an electric field.

16. The method of claim 15 further comprising utilizing a capacitance formed between the exciter electrode and the DCCS as a circuit element.

17. The method of claim 15 further comprising positioning the electronic circuitry away from an edge of the RFID device.

18. The method of claim 15 further comprising positioning the electronic circuitry in close proximity to the DCCS.

19. The method of claim 15 further comprising extending at least one dimension of the DCCS beyond a boundary formed by the exciter electrode and the electronic circuitry.

20. The method of claim 15 further comprising extending at least one dimension of the DCCS and the electronic circuitry beyond a boundary formed by the exciter electrode.

21. The method of claim 15 further comprising reducing at least one dimension of the exciter electrode to be within a boundary formed by the DCCS and the electronic circuitry.

\* \* \* \* \*